C. R. UNDERHILL.
ELECTRICAL COIL AND METHOD OF MAKING THE SAME.
APPLICATION FILED JAN. 19, 1912.

1,036,936.  
Patented Aug. 27, 1912.

UNITED STATES PATENT OFFICE.

CHARLES R. UNDERHILL, OF NEW HAVEN, CONNECTICUT, ASSIGNOR TO THE ACME WIRE CO., OF NEW HAVEN, CONNECTICUT, A CORPORATION.

ELECTRICAL COIL AND METHOD OF MAKING THE SAME.

1,036,936. Specification of Letters Patent. Patented Aug. 27, 1912.

Application filed January 19, 1912. Serial No. 672,136.

*To all whom it may concern:*

Be it known that I, CHARLES R. UNDERHILL, a citizen of the United States, residing at New Haven, in the county of New Haven and State of Connecticut, have invented a new and useful Improvement in Electrical Coils and Methods of Making the Same; and I do hereby declare the following, when taken in connection with the accompanying drawings and the characters of reference marked thereon, to be a full, clear, and exact description of the same, and which said drawings constitute part of this specification, and represent, in—

Figure 1:
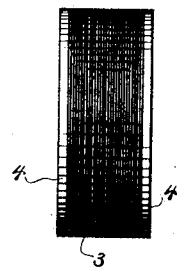
Figure 2:
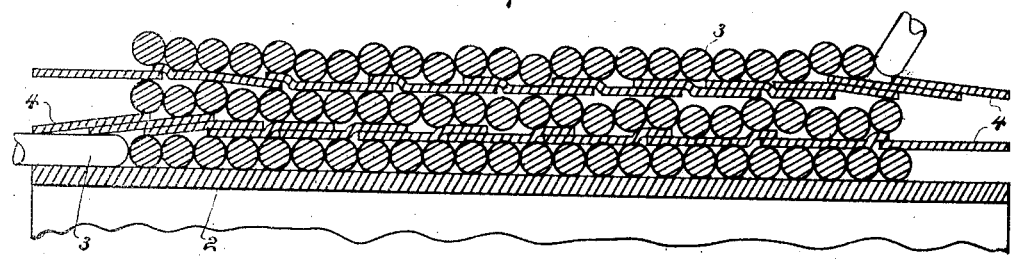
Figure 3:
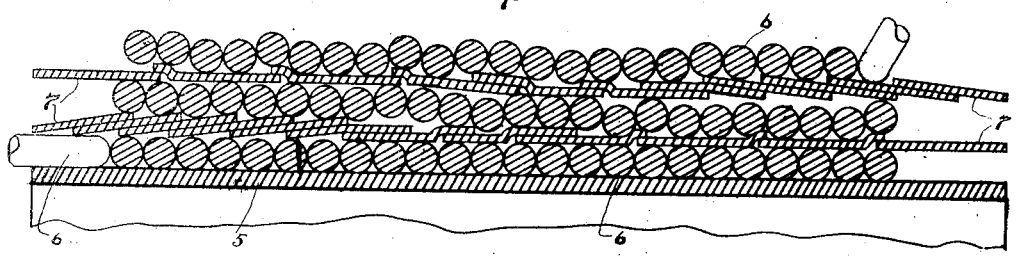
Figure 4:
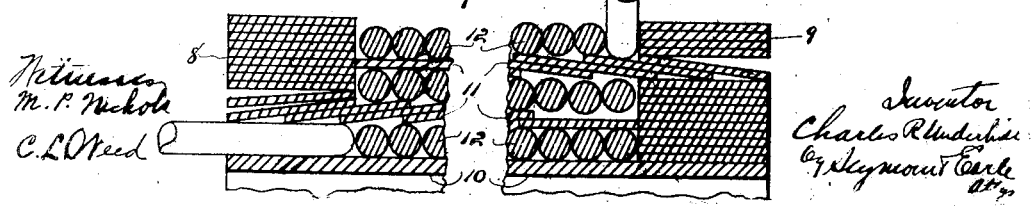

Figure 1 a view in side elevation of an electrical coil constructed in accordance with my invention. Fig. 2 a broken view in central longitudinal section on an enlarged scale, of a coil constructed in accordance with my invention by having its insulation laid on in the form of a tape wound spirally with a progressive overlap, this view being schematic in so far as it is not practical to accurately show the thickness of the tape as compared with its width. Fig. 3 a broken schematic view showing the insulating material differentiated in bulk from one end of the coil to the other by being spirally wound singly for the first half of each layer, and doubly for the second half of each layer. Fig. 4 a broken view of another modified form of my improved coil in which the differentially disposed tapes terminate in solid laminated closures built up by winding the tapes concentrically.

My invention relates to an improvement in that class of electrical coils in which the layers of insulating material interposed between the layers of wire are differentiated in bulk in accordance with the difference of electrical potential between the layers of wire; the object of my invention being to secure an economy of space and material in making such coils as well as to enhance their mechanical and electrical durability by employing tapes of insulating material spirally wound so as to produce between the layers of wire layers of insulating material differentiated in bulk localized in accordance with the electrical stress.

With these ends in view, my invention consists in certain details of construction and method of production as will be more fully hereinafter described and pointed out in the claims.

In carrying out my invention, I employ thin narrow spirally wound tapes of paper, silk or other suitable insulating material. I may here state that I have chosen the term "tapes" advisedly to describe thin narrow ribbons of paper or other insulating material adapted to be wound spirally in the production of electrical coils of superior compactness and solidity, in place of sheets of paper wound concentrically either in the production of individual coils, or in the production of coils in multiple which are subsequently shown apart, the sheets of paper employed in the production of coils in multiple, being initially as wide as the whole number of coils placed end to end.

In carrying out my invention, as shown in Fig. 2, I employ a hollow paper core 2 which may be of tubular, rectangular, hexagonal or other cross-section. Upon this core, I wind alternate layers of wire 3 and paper tapes 4, the wire and paper being wound on manually, or by automatic or semi-automatic machinery of approved construction. After the first layer of wire 3 has been wound upon the core from left to right, a thin narrow tape 4 of paper is wound from right to left with a progressively increasing overlap, so that while the first turns of paper are barely overlapped edge over edge, the final turns of paper are overlapped half their width. It is apparent that in practice the overlap may be more or less, according to requirements, but the principle of progressively increasing the overlap from one end of the coil to the other so as to meet the increasing electrical potential from one end of the coil to the other will be adhered to. The first layer of paper having been completed, the second layer of wire is wound on from right to left over the first layer of paper. The second layer of wire is followed by the second layer of paper which is spirally wound from left to right with a progressively increasing overlap. This scheme of winding is carried on until the coil has been built up to the required size.

As shown in Figs. 1 and 2, the tapes 4 are wound so as to project beyond the end turns of the respective layers of wire 3. After the completion of the winding operation, the projecting edges of the tapes may or may not be varnished or treated with some other solidifying compound, or the spaces between the layers of tape may be filled in so as to form solid heads or closures of compound, or the projecting edges of the tapes may be crushed against the end turns of the layers of wire. These different methods of treating the ends of the coils are not illustrated as they do not differ from the treatment of the edges of paper sheets when the coil is built up of alternate layers of wire and concentrically wound sheets of paper. Or the coils may be furnished with solid laminated closures built up from the tapes at the ends of the layers of wire and tape, as shown in Fig. 4.

In the modified construction shown by Fig. 3, the coil consists of a paper core 5 upon which are built up alternate layers of wire 6 and paper tape 7; but instead of winding the tape 7 so as to cause it to progressively increase in overlap from one end of the coil to the other, as shown in Fig. 2, the tape is spirally wound at a uniform pitch to approximately the middle of the coil after which its winding pitch is changed so that from this point it will be regularly overlapped for about half its width, with the result that the amount of paper applied to the coil in the production of any one layer of paper will be about double at one side of the middle layer from what it is on the other side of the middle of the same layer. As shown in Fig. 3, a layer of wire 6 is first wound upon the core 5 from left to right; then a layer of tape 7 is wound from right to left with a uniform overlap until it reaches about the middle of the coil, after which its winding pitch is increased so that from this point it will be overlapped for about half its width until it reaches the left hand end of the coil. The second layer of wire now follows from right to left. This is succeeded by the second layer of tape which is regularly overlapped from left to right until it reaches about the middle of the coil when its winding pitch is increased so that from this point it will be overlapped for about half its width until it reaches the right hand end of the coil. In this way the coil will be built up until the desired size is reached, or until a predetermined amount of wire and paper have been wound on. It will be seen by referring to Fig. 3, that the greatest thickness of paper in the first layer is on the left hand of the middle of the coil, while the greatest thickness of paper in the second layer of paper is at the right hand of the middle of the coil, whereby a perfect balance of insulating material is maintained in building up the coil. It will also be noted that the overlapping of the tape at about the middle of the coil will be made slightly irregular in shifting from one winding pitch to another. This appears in Fig. 3.

It is apparent that the principle of construction illustrated in Fig. 3, permits the tapes to be wound, so to speak, in zones of different thickness; that is to say, for the first third of the entire length of the coil, the paper might be wound on in one thickness, the intermediate third in two thicknesses, and the final third in three thicknesses. The illustration will suffice for the deduction of the principle.

In the construction shown by Fig. 4 of the drawings, solid laminated end-closures 8 and 9 are progressively built up on the ends of the core 10 by reducing the winding pitch of the tapes to zero after the introduction of the spirally wound paper tape layer-insulation 11 between the layers of wire 12, the tapes being wound on with a progressive overlap, as shown in Fig. 2, or with the overlap increased to half the width of the tapes as shown in Fig. 3 so as to localize the differentiation in the bulk of the insulating material in accordance with the localization of electrical stress between the respective layers of wire. The gaps in the end-closures 8 and 9 as shown by Fig. 4, are the result of the schematic character of the illustration. The tapes are so thin that in practice they solidify when wound turn upon turn despite the transition from layer-insulation to end-closures and vice versa.

I claim:—

1. An electrical coil composed of alternate layers of wire and insulating material, the insulating material being applied in the form of spirally wound tapes which are differentiated in number of turns per inch so as to differentiate the bulk of insulating material in accordance with the difference of potential between the layers of wire.

2. An electrical coil comprising alternate layers of wire and insulating material, the insulating material being applied in the form of narrow tapes wound spirally with progressively increasing overlap in accordance with the difference of potential between the layers of wire.

3. An electrical coil consisting of an insulating core and alternate layers of insulating material and wire, the insulating material being applied in the form of spirally wound tapes, the number of turns per inch of which are varied so as to differentiate the thickness or bulk of the layers of insulating material in accordance with the differences of electrical potential between the layers of wire and the edges of the layers of insulating material being projected beyond the end turns of the layers of wire.

4. A method of making an electrical coil consisting in winding, one upon the other, alternate layers of wire and thin, narrow spirally wound tapes of insulating material which tapes are progressively overlapped so as to differentiate the layers in bulk in accordance with the electrical stress between the layers of wire.

In testimony whereof, I have signed this specification in the presence of two subscribing witnesses.

CHARLES R. UNDERHILL.

Witnesses:
GEORGE D. SEYMOUR,
CLARA L. WEED.

Copies of this patent may be obtained for five cents each, by addressing the "Commissioner of Patents, Washington, D. C."